United States Patent
Laws

[15] 3,677,291
[45] July 18, 1972

[54] CHANGE-OVER VALVES

[72] Inventor: Peter Laws, 16 Steele's Road, London, N.W. 5, England

[22] Filed: Sept. 28, 1970

[21] Appl. No.: 76,192

Related U.S. Application Data

[63] Continuation-in-part of Ser. No. 687,954, Nov. 15, 1967, abandoned.

[52] U.S. Cl. .......................... 137/554, 137/555, 137/625.29, 210/340
[51] Int. Cl. ......................................................... F16k 37/00
[58] Field of Search ................ 210/278, 340, 108; 137/554, 137/555, 625.4, 625.29; 251/63

[56] References Cited

UNITED STATES PATENTS 3,397,784   8/1968   Carr.......................................210/108
3,439,706   4/1969   Barrett..................................137/554

FOREIGN PATENTS OR APPLICATIONS 907,645   3/1954   Germany..............................210/340

Primary Examiner—Henry T. Klinksiek
Attorney—Alexander & Dowell

[57] ABSTRACT

The invention provides a fluid flow path or source selector valve, comprising a valve body defining a valve chamber with a main port a pair of subsidiary ports and a valve seat internally of the chamber for each subsidiary port, valve means mounted in the chamber for movement across the chamber between the valve seats and defining a pair of valve faces each adapted for sealing engagement with one of said valve seats, and fluid pressure operated actuating means for effecting movement of the valve means across the valve chamber to selectively seal off one or other of said subsidiary ports.

6 Claims, 4 Drawing Figures

FIG. I.

CHANGE-OVER VALVES

This application is a continuation-in-part of application Ser. No. 687,954, filed 15 Nov. 1967 and now abandoned.

The invention relates to a change over valve.

In applications where a fluid handling device such as an oil filter has to be maintained in continuous operation for long periods, a second device is frequently provided in parallel with the first, so that whilst one device is undergoing servicing or repair the other can continue to handle the fluid. Change over arrangements are of course required to bring one device or the other on stream and the invention is concerned with a selector valve and a selector valve assembly for duplicated fluid handling devices for example, oil coolers, dryers and filters.

The invention provides a fluid flow path or source selector valve, comprising a valve body defining a valve chamber with a main port and a pair of subsidiary ports, each subsidiary port including a valve seat internally of the chamber, valve means mounted in the chamber for movement across the chamber between the valve seats and defining a pair of valve faces each adapted for sealing engagement with one of said valve seats, and fluid pressure operated actuating means for effecting movement of the valve means across the valve chamber to selectively seal off one or other of said subsidiary ports.

In order that the invention may be more clearly understood a preferred example thereof will now be described in greater detail with the aid of the accompanying drawings in which.

Figure 1:
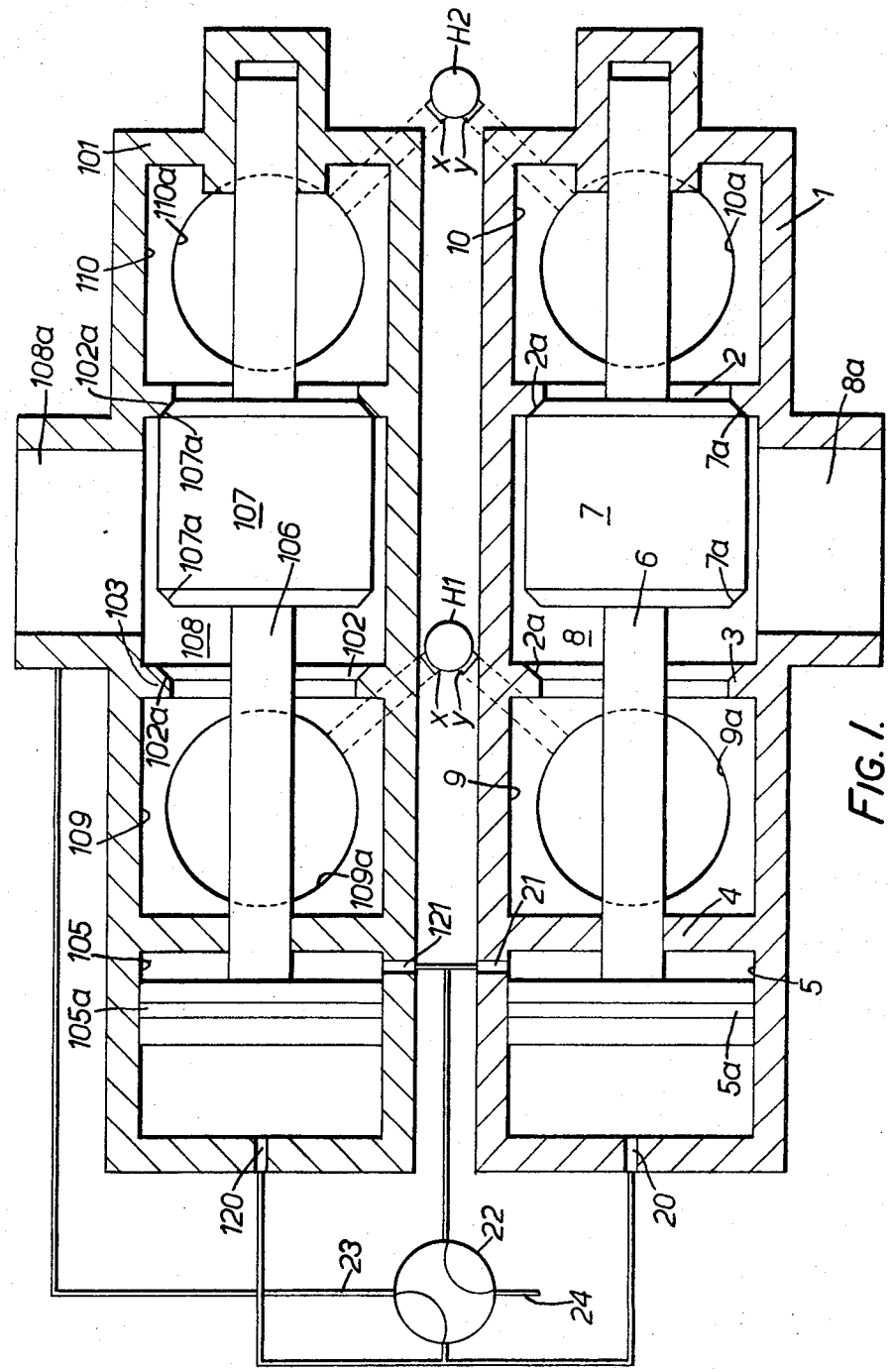
FIG. 1 shows a schematic layout of an assembly embodying the invention.

Referring first to FIG. 1, the assembly shown comprises a pair of valves 1 and 101 of substantially identical construction. The following description of the valve 1 will also suffice for the valve 101, the various identical parts of which bear reference numerals increased by 100 for distinguishing purposes.

The valve body of the valve 1 defines a main valve chamber 8 having a main port 8a and two subsidiary ports 2 in transverse walls 3. The subsidiary ports 2 are provided with bevelled valve seats 2a on their inner peripheries.

The valve body further defines a pair of subsidiary chambers 9 and 10: one on each side of the main valve chamber 8 and with which the subsidiary ports 2 communicate. A pair of externally opening ports 9a and 10a are provided respectively in the subsidiary chambers 9 and 10.

At its end opposite the wall 3, the subsidiary chamber 9 is defined by a transverse wall 4 which separates the chamber 9 from a cylinder 5. The cylinder 5 has a first fluid port 20 at its end remote from the wall 4 and a second fluid port 21 immediately adjacent the wall 4.

A piston 5a, slidingly sealed to the side walls of the cylinder, is mounted on one end of a valve stem 6. The valve stem 6 extends through a fluid tight slide bearing in the wall 4, through the subsidiary ports 2, and is slidably journalled at its other end in the end wall of subsidiary chamber 10 remote from the wall 3. Within the main valve chamber 8, the valve stem 6 carries a valve member 7 which is formed with opposed bevelled valve faces 7a each adapted to sealingly engage with one of the bevelled valve seats 2a.

Referring more generally to FIG. 1, the first fluid ports 20,120 of the cylinders 5,105 are connected to one port of a four port cock 22 and the second fluid ports 21,121 are connected to another port of this cock. Another port of the cock is connected to the chamber 108 at the main port 108a of valve 101 and the fourth port of the cock is connected to discharge or waste. One embodiment of this cock which can be located remotely from the cylinders 5 and 105 if required is described below with reference to FIGS. 2 and 3 of the accompanying drawings.

The external port 109a of valve 10 is connected to the inlet X of a fluid handling device shown representatively at H1 and the port 110a is similarly connected to the inlet X of a fluid handling device shown representatively at H2. The outlets Y of the fluid handling devices H1 and H2 are connected respectively to the external ports 9a and 10a of the valve 1.

Figure 3:
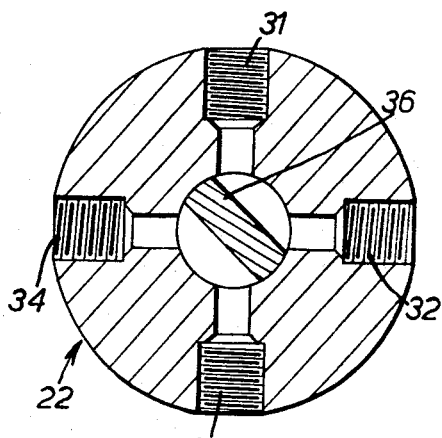
FIG. 3 is a section on the line III—III of FIG. 2.

Referring now to FIGS. 1 and 3, the four way cock shown comprises a cylindrical body 30 having a central bore and four screw threaded ports 31, 32, 33 and 34, located at 90° spacing, which terminate in the bore. A rotatable plug 35 is located in the bore and is cut away to form a diametric vane 36 in the zone where the ports 31, 32, 33 and 34 connect with the bore.

On each side of the vane 36, rotary seals 37 and 38 are provided which prevent escape of fluid axially along the plug 35. At the end of the body 30, a flange 40 is provided on the plug 35 which may be gripped by the fingers and rotated to index the vane 36 as required. On the face of the flange 40 which faces the body 30 a pair of recesses are provided in which a spring loaded ball 39 locates upon appropriate movement of the plug. The recesses are located at 90° spacing so that the vane 36 may be optionally located in one of two positions as explained below. A circlip 41 is provided at the other end of the body 30 to prevent inadvertent withdrawal of the plug 35 therefrom.

Figure 2:
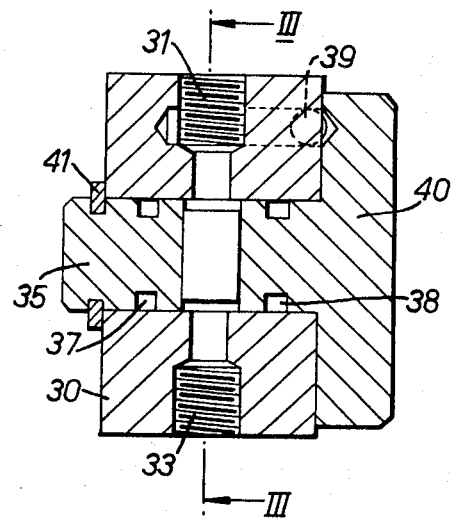
FIG. 2 is an axial section through a control cock for the assembly of FIG. 1.

When utilized in the assembly of FIG. 1 (as the cock 22), the four way cock of FIGS. 2 and 3 has the port 31 connected to the valve chamber 108 and the port 33 to waste or discharge. The port 32 is connected to the ports 21 and 121 and the port 34 to the ports 20 and 120.

In use the assembly of FIG. 1 is assumed to have the main port 108 connected to a source of fluid which is to be handled, for example filtered, by one of the devices H1 and H2. With the plug 35 of the four way cock 22 in the position shown in FIG. 3, fluid from the valve chamber 108 received via the port 31 is directed through port 32 and thence to the ports 21 and 121 of the cylinders 5 and 105. The port 34 is at the same time connected to port 33 in the four way cock. The fluid pressure applied to the right hand sides of pistons 5a and 105a causes the pistons to more leftwardly as seen in the drawing, fluid from the left hand ends of the cylinders being discharged through ports 20 and 120 to port 34 and thence to waste through port 33.

The leftward movement of the pistons 5a and 105a causes similar movement of the valve stems 6 and 106. The left hand valve faces 7a and 107a of the valve members seat on the left hand valve seats 2a and 102a, this seating being assisted by the fluid pressure within the chambers 8 and 108. Fluid from the main port 108a is then directed through the right hand subsidiary port 102 and external port 110a of valve 101 to the fluid handling device H2. Fluid received from the fluid handling device H2 by the external port 10a of the valve 1 is directed through the right hand subsidiary port 2 to the main port 8a.

If the plug 35 is rotated through 90° to its second position, the port 31 is connected to the port 34 and the port 32 to the port 33. Fluid pressure is thus applied to the left hand sides of the pistons 5a and 105a and the valve members 7 and 107 moved rightwardly to seal the right hand subsidiary ports 2a and 102a. In consequence fluid from the port 108a is directed through the fluid handling device H1.

An arrow is engraved upon the outer face of the flange 40 in line with the vane 36 serves to indicate the operative position of the plug and also that of the pistons 5a and 105a and valve members 7 and 107; and hence the device H1 or H2 which is in service.

Figure 4:
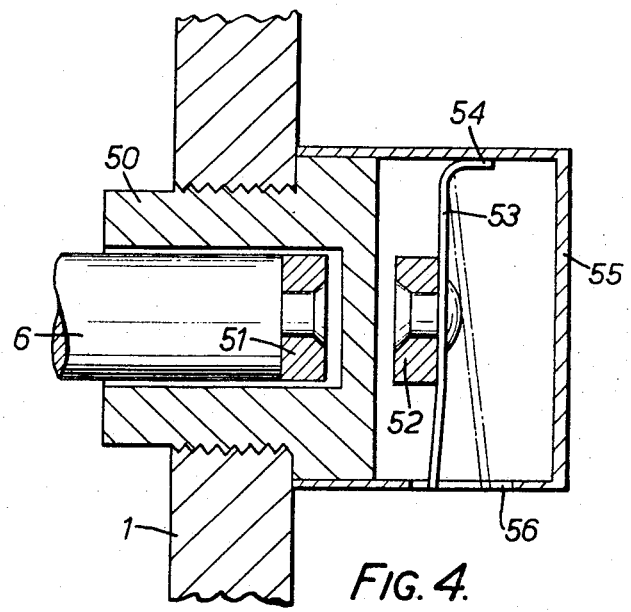
FIG. 4 is an axial section through an indexing means for indicating the position of the control valve means.

As an alternative or an addition to the indicating means referred to above, other means for indicating the positions of valve members 7 and 107, for example, the device shown in FIG. 4, may be employed. This may be applied to either or both valve stems 6 and 106 and at either end of them. It need only be applied to one of them, but if applied to both the constructional details of each will be identical so that the following description applies equally to both.

One end of valve stem 6, i.e. the right hand end as seen in FIG. 1, is guided in a bush 50 of non-magnetic material which is attached to the end of cylinder 1. A permanent magnet 51 is mounted on the end of the stem 6, and a second magnet 52 is mounted on a light plate spring 53 secured at one end in a cover 55 so that the magnet 52 faces magnet 51. The magnets are arranged with unlike poles adjacent. The spring 53 is anchored at 54 to cover 55 also of non-magnetic material, and its other end is free and extends through a slot 56 in the cover. The axial position of cover 55 is adjusted relatively to bush 50 such that the magnetic attraction between the two magnets causes the magnet 52 and spring 53 to deflect towards the left in FIG. 4 when the spindle 6 has moved sufficiently to the right such that the right hand valve face 7a is seated on the valve seating 2a. When the spindle 6 is at the other end of its stroke however, attraction between the magnets is insufficient to maintain the spring in its deflected position and it returns to the right again. These movements of the spring as seen through the slot, indicate which of the fluid handling devices H1 or H2 is in operation.

It is to be understood that the invention can be embodied in a variety of ways other than as described above, for instance, the valves 1 and 101 can be arranged in axial alignment so that only one valve stem and one piston will be required.

I claim:

1. In a fluid path selector assembly, the combination of:
   a. a fluid flow selector valve comprising: a valve body defining a valve chamber with a main port for communication to the supply of a fluid circuit and a pair of oppositely disposed subsidiary ports; valve means mounted in said chamber for movement thereacross to close off selectively one or the other of said subsidiary ports and communicate the unclosed subsidiary port with said main port; a pair of subsidiary chambers defined in said valve body into each of which one of said subsidiary ports opens; and a piston means fast for linear movement with said valve means and mounted in a cylinder defined within said valve body;
   b. a pair of fluid handling devices each having an inlet and an outlet, said devices being in communication via their respective inlets one with one of said subsidiary chambers and the other with the other subsidiary chamber by which said fluid handling devices may selectively be supplies with fluid from said main port in dependence upon which of said subsidiary ports is communicated by said valve means with said main port; and
   c. a four-way flow control valve having a body defining a first port in communication with said main port; a second port in communication with said cylinder to one side of said piston means, a third port in communication with said cylinder to the other side of said piston means; and a fourth port communicating to discharge; and a changeover valve selectively movable within said control valve body for communicating said first port selectively with either of said second and third ports and, concomitantly, said fourth port selectively with the unconnected third or second port, by which fluid from said main port is selectively directable to one side or the other side of said piston means to urge said piston means along said cylinder, thereby to effect discharge of inoperable fluid therefrom to waste and valve operating motion of said valve means within said valve chamber.

2. In the fluid path selector assembly set forth in claim 1, a second said fluid flow selector valve of which said main port is for communication with a region of the fluid circuit downstream of said supply; one of said subsidiary chambers communicating with said outlet of one of said fluid handling devices and the other subsidiary chamber with said outlet of the other fluid handling device; and said second and third ports of said four-way control valve are selectively communicable with said cylinder of said second flow selector valve at opposite sides of said piston means thereof, whereby both said inlet and outlet of one of said fluid handling devices can be isolated from said fluid circuit while the other fluid handling device is in fluid communication with said circuit.

3. The fluid path selector assembly set forth in claim 2, wherein each said valve means is fast with a valve stem which extends through one of said subsidiary chambers into said cylinder and is fast therein with said piston means.

4. The fluid path selector assembly set forth in claim 3, wherein indicator means are provided which are responsive to the movement of said valve stem to indicate the position of said valve means in said valve chamber.

5. The fluid path selector assembly set forth in claim 4, wherein said indicator means comprise a first magnet mounted on said valve stem, and a second magnet coupled to an indicating element and in such position as to be influenced by said first magnet to assume a predetermined position when said first magnet is moved by said valve stem into proximity therewith.

6. The fluid path selector assembly set forth in claim 5, wherein said indicating element comprises a leaf spring secured at one end in a casing carried on the end of said valve body and having a free end projecting through a slot in said casing in which it is movable.

* * * * *